United States Patent
Takagi et al.

(10) Patent No.: US 6,874,954 B2
(45) Date of Patent: Apr. 5, 2005

(54) LIGHT-EMITTING MODULE

(75) Inventors: Toshio Takagi, Yokohama (JP); Norimasa Kushida, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/697,642

(22) Filed: Oct. 31, 2003

(65) Prior Publication Data

US 2004/0136662 A1 Jul. 15, 2004

(30) Foreign Application Priority Data

Oct. 31, 2002 (JP) .................................... 2002-318461

(51) Int. Cl.⁷ ............................................ G02B 6/255
(52) U.S. Cl. .......................... 385/92; 385/147; 372/6
(58) Field of Search ........................... 385/88–92, 147; 372/6, 70, 96, 50; 359/344; 356/497

(56) References Cited

U.S. PATENT DOCUMENTS

| | | | |
|---|---|---|---|
| 5,825,792 A | | 10/1998 | Villeneuve et al. |
| 6,488,419 B2 | * | 12/2002 | Kato et al. .................... 385/93 |
| 6,580,740 B2 | * | 6/2003 | Funabashi et al. ............ 372/50 |
| 6,805,494 B2 | * | 10/2004 | Miki et al. .................... 385/88 |
| 2002/0018627 A1 | * | 2/2002 | Kato et al. .................... 385/93 |
| 2002/0180944 A1 | * | 12/2002 | Fujii et al. .................... 355/70 |
| 2003/0016720 A1 | * | 1/2003 | Funabashi et al. ............ 372/96 |
| 2003/0053499 A1 | | 3/2003 | Shinkai et al. |
| 2003/0063635 A1 | | 4/2003 | Takagi et al. |
| 2003/0063636 A1 | * | 4/2003 | Sasaki ......................... 372/32 |
| 2003/0063871 A1 | | 4/2003 | Yabe et al. |
| 2003/0112500 A1 | * | 6/2003 | Miki et al. ................... 359/344 |
| 2003/0147435 A1 | | 8/2003 | Sugitatsu et al. |
| 2004/0021874 A1 | * | 2/2004 | Shimmick .................... 356/497 |

FOREIGN PATENT DOCUMENTS

| JP | 2000-223747 | 8/2000 |
|---|---|---|
| JP | 2002-314187 | 10/2002 |

* cited by examiner

*Primary Examiner*—Akm Enayet Ullah
(74) *Attorney, Agent, or Firm*—Smith, Gambrell & Russell, LLP

(57) ABSTRACT

This invention provides a light-emitting module in which the semiconductor light-emitting device and its driver circuit are arranged in side by side configuration, thereby realizing a high-speed transmission. The light-emitting module comprises the first beam splitter that splits light emitted from the front surface of the light-emitting device into an output light and a monitoring light. The monitored light is split again by the second splitter into the first and second monitoring light, one of which is monitored by the wavelength detector. Since the wavelength detector monitors the front light emitted from the light-emitting device, the driver can be arranged in side by side to the light-emitting device.

13 Claims, 11 Drawing Sheets

LIGHT-EMITTING MODULE

BACKGROUND OF THE INVENTION

1. Field of the Invention

The present invention relates to light-emitting module.

2. Related Prior Art

A light-emitting module generally comprises a semiconductor light-emitting device and a package for enclosing the light-emitting device. Such module is used in, for example, the wavelength division multiplexing (WDM) communication system. In the WDM communication system, since a plurality of optical signal each having a particular wavelength is transmitted through an optical fiber, respective optical signal source using the semiconductor light-emitting device must be controlled precisely in its output wavelength. Accordingly, a conventional optical module has a mechanism for monitoring the output wavelength by receiving light emitted from a rear surface of the light-emitting device. Such optical module is disclosed in a Japanese patent specification laid open 2000-223747.

In recent optical communication system, especially in the WDM system, a transmission speed or a signal frequency increases to some gigabit or more. In order to operate the optical module for such high-speed and high-frequency data, an driver for electrically driving the light-emitting device must be not only enclosed in the package but also arranged side by side configuration with the light-emitting device. However, in the conventional module, since the mechanism for monitoring the output wavelength of the device are disposed between the light-emitting device and the driver, the electrical path between them can not be shortened, thereby suppressing the high frequency performance of the optical module.

SUMMARY OF THE INVENTION

An object of the present invention is to provide a light-emitting module that enables to shorten the distance between the light-emitting device and the driver, to enhance the high frequency performance thereof.

According to the present invention, a light-emitting module comprises a light-emitting device, a first light-receiving device and a wavelength detector. The wavelength detector comprises a second light-receiving device and an etalon device. The light-emitting device emits light with an output power and an output wavelength from the light-emitting surface thereof. The module further comprises a driver for electrically driving the light-emitting device.

In the present module, since the wavelength detector is disposed in one side of the light-emitting device, while the driver is disposed in the other side thereof, the driver and the light-emitting device are arranged in side by side configuration, thereby shortening the distance therebetween and enhancing the high frequency performance of the module.

In the one side of the light-emitting device, a first and second beam splitters are also disposed. The first beam splitter splits the light emitted from the light-emitting device into an output light and a monitored light. The monitored light travels to the second beam splitter and splits thereby into a first monitored light, which travels to the first light-receiving device and a second monitored light, which travels to the etalon device and reaches to the second light-receiving device. The first monitored light is served for controlling the output power of the light-emitting device, while the second monitored light is for controlling the output wavelength of the light-emitting device.

Since the output power and the output wavelength of the light-emitting device are monitored independently with each other, the output wavelength of the light-emitting device can be controlled precisely by correcting the change of the output wavelength from that of the output power.

In the present invention, the first and the second beam splitters may be arranged in the same region in the package or may be disposed in an opening provided in the side portion of the package for transmitting the output light therethrough.

The light-emitting device in the present invention may be a semiconductor laser diode or may be a device type of a laser diode integrated with an optical modulator. The modulator may be a type of a semiconductor electro-absorption device and the semiconductor laser diode may be a type of a distributed feedback laser (DFB). When the light-emitting device is the type of the semiconductor laser integrated with the optical modulator, the present invention further includes a third light-receiving device disposed in a side opposite with respect to the side where the first and the second light-receiving device are disposed.

Since the third light-receiving device may monitor light emitted from the rear surface of the light-emitting device and the first light-receiving device may monitor the light emitted from the front surface thereof, a characteristic of the optical modulator can be detected by comparing both light.

DETAILED DESCRIPTION OF PREFERRED EMBODIMENTS

Preferred embodiments according to the present invention will be described hereinbelow. In the description and the drawings, the same symbols are assigned to the same elements without overlapping explanation.

First Embodiment

Figure 1:
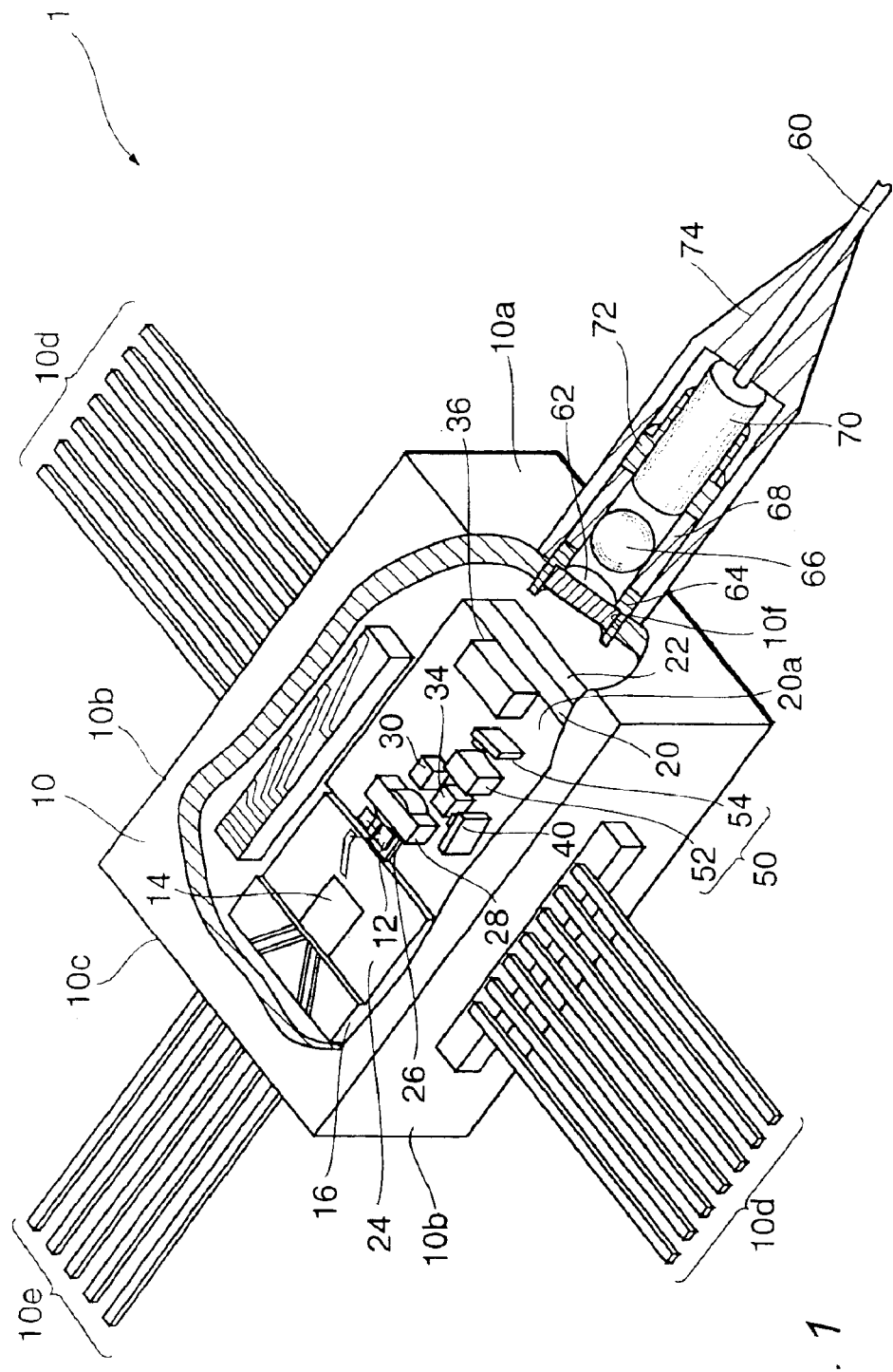
FIG. 1 is a partially perspective view of the optical module according to the first embodiment.
Figure 2:
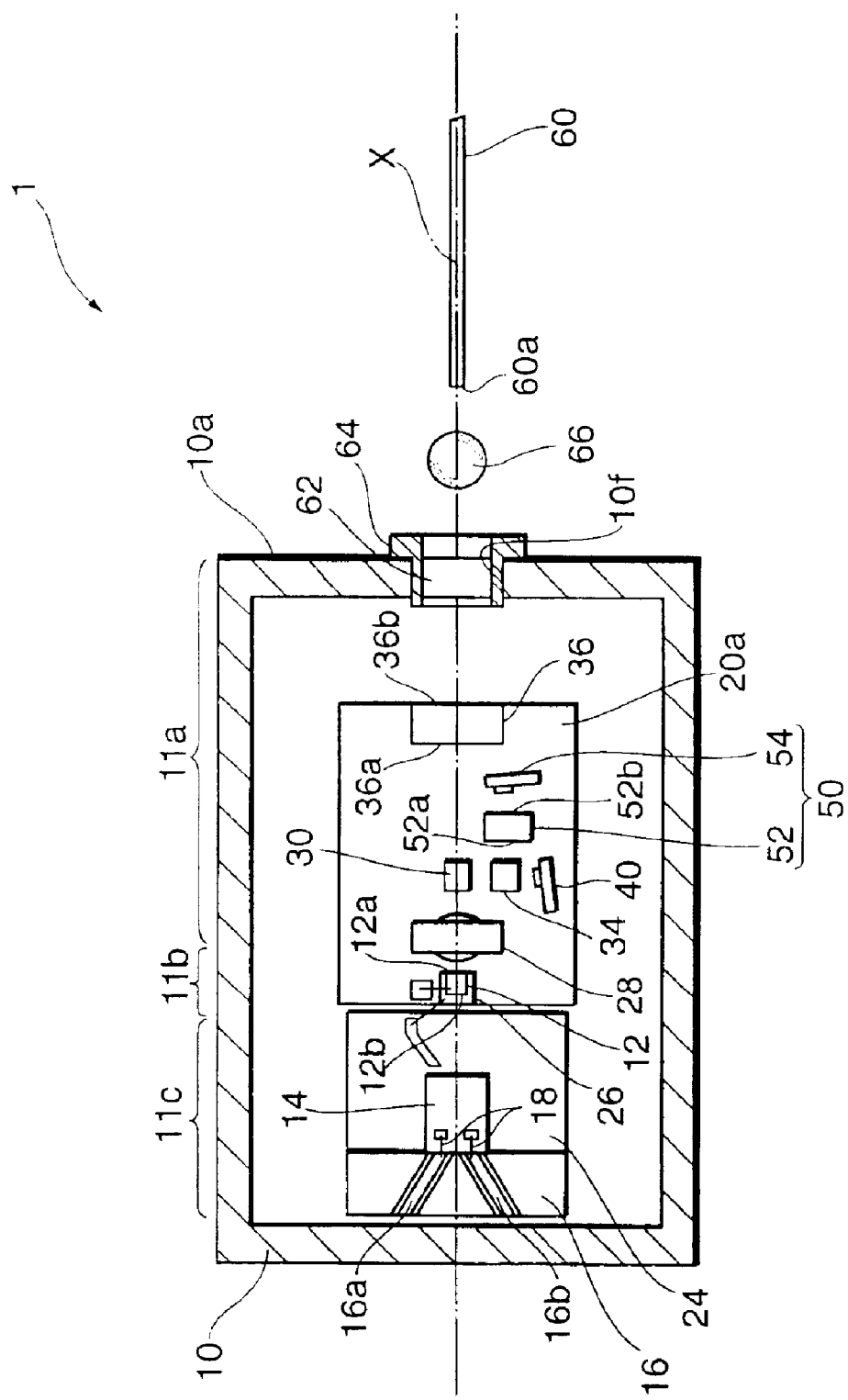
FIG. 2 is a plan view showing an optical and an electrical arrangement of the optical module according to the first embodiment.

FIG. 1 is a partially perspective view of an optical module 1 according to the invention and FIG. 2 is a plan view showing optical and electrical couplings between components in the optical module 1. The optical module 1 comprises a package 10, a semiconductor light-emitting device 12, a driver 14, a collimating-lens 28, a first beam splitter 30, a second beam splitter 34, an optical isolator 36, a semiconductor light-receiving device 40, a wavelength detector 50, and an optical fiber 60.

The package 10 comprises a front portion 10a and a rear portion 10c, which intersect a hypothetical axis X, and a pair of side portions 10b extending along the axis X. Each side portions 10b and the rear portion 10c have a plurality of lead terminals 10d and 10e, respectively. The package 10 is divided into a first 11a, a second 11b and a third regions 11c; each provided along the axis X in this order from the front portion 11a. The package 10 also encloses a first base 20 and a second base 24. The first base 20 is made of thermally conductive material and has a mounting surface 20a, on which the light-emitting device 12, the collimating-lens 28, the first beam splitter 30, the second beam splitter 34 and the optical isolator 36 are arranged. The first beam splitter 30 and the light-emitting device 12 are mounted in the first region 11a and the second region 11b, respectively. The first base 20 is mounted on the Peltier element 22 that controls a temperature of the light-emitting device 12, whereby an output wavelength of the light-emitting device 12 may be adjusted.

The light-emitting device 12 is provided an electrical signal from the driver 14, and outputs light modulated by the electrical signal. The light-emitting device may be a laser diode directly modulated by the electrical signal and may be another type of a device, for example, in which a laser diode with a distributed feedback type (DFB) and a modulator device with an electro-absorption type (EA) are monolithically integrated and called as EA-DFB device. The light-emitting device 12 is placed on the mounting surface 20a of the first base 20 through the heat sink 26 with one electrode thereof connected to the ground and the other electrode connected to the driver 14 with bonding wires.

The driver 14 is mounted on the second base 24 disposed in the third region 11c of the package 10 and in adjacent to the light-emitting device 12. The driver amplifies the electrical signal provided from the outside of the package 10 through the lead terminal 10e and outputs the amplified signal to the light-emitting device 12, thereby driving the light-emitting device.

A wiring substrate 16 includes a pair of transmission lines 16a and 16b thereon. Respective ends of the transmission lines 16a and 16b are connected to the driver through bonding-wires 18. The other end of the transmission lines 16a and 16b are connected to lead terminals 10e thorough another bonding-wires.

The collimating-lens 28 is optically coupled to the light-emitting surface 12a of the light-emitting device 12. The light emitted from the light-emitting surface 12a travels to the first beam splitter 30 passing through the collimating-lens 28.

The first beam splitter 30 splits the light passing through the collimating-lens 28 into an output light traveling to the optical isolator 36 and a monitoring light, which is reflected by the first beam splitter 30 and travels to the second beam splitter 34. The first beam splitter 30 may be one of a half-mirror and a cubed beam splitter.

The optical isolator 36 has a light-incident surface 36a optically coupled to the light-emitting surface 12a of the light-emitting device 12 and a light-emitting surface 36b optically coupled to a tip 60a of the optical fiber 60. The optical isolator 36 only passes a light entered from the light-incident surface 36a and prevents a light entering from the light-outgoing surface 36b from transmitting to the light-incident surface 36a.

The front portion 10a of the package 10 has an opening 10f intersecting the axis X, within which a ring member 64 that supports a hermetic glass 62 is disposed, thereby hermetically sealing the package 10. On the ring member 64, an edge of a lens holder 68 that supports a condenser lens 66 is fixed. The condenser lens 66 is optically coupled to the light-emitting surface 12a of the light-emitting device 12 through the first beam splitter 30, the optical isolator 36 and the hermetic glass 62, and focuses the light from the light-emitting surface 12a on the tip surface 60a of the optical fiber 60. On the another edge of the lens holder 68, a ferrule holder 72 supporting a ferrule 70 is fixed. The optical fiber 60 is inserted into the ferrule 70. The ring member 64, the lens holder 68, and the ferrule holder 72 are covered by a boot 74.

The second beam splitter 34 splits the monitoring light split by the first beam splitter 30 into a first monitoring light traveling to the first light-receiving device 40, by which an output power of the light emitted from the light-emitting device 12 is monitored, and a second monitoring light by which an output wavelength of the light is monitored. The second monitoring light reflected by the second beam splitter 34 travels to the wavelength detector 50. The second beam splitter, similarly to the first beam splitter 30, may be one of a half mirror and a cubed beam splitter.

The light-receiving device 40 is optical coupled to the light-emitting surface 12a of the light-emitting device 12 through the first and second beam splitters 30 and 34. The first light-receiving device 40 may be a photodiode. The first light-receiving device receives the first monitoring light split by the second beam splitter 34 and generates a first photocurrent corresponding to a magnitude of the first monitoring light. Since the first photocurrent corresponds to the magnitude of the first monitoring light and the first monitoring light reflects the front light emitted from the light-emitting surface 12a, the output power of the light-emitting device 12 is detected through the first photocurrent. The wavelength detector 50 generates a second photocurrent corresponding to a magnitude of the second monitoring light split by the second beam splitter 34. The wavelength detector 50 comprises an etalon device 52 and a photodiode 54. The etalon device 52 has a light incident surface 52a optically coupled to the light-emitting device 12 through the first and second beam splitters, and a light emitting surface 52b coupled to the photodiode 54. The etalon device is a type of a band-passing filter that has a transmittance spectrum with a maximum at a predetermined wavelength, which is determined by an optical pass length between the light-incident surface 52a and the light-emitting surface 52b. Namely, the transmittance spectrum shows a maximum at the wavelength where the incoming light and the outgoing light is inphase within the etalon, while the transmittance spectrum shows a minimum at the wavelength where the incoming light and the outgoing light is out of phase. The light-receiving device 54, which may be a photodiode, receives light transmitted through the etalon and generates a second photocurrent corresponding to the magnitude thereof. Since the second photocurrent varies as the wavelength of the light received by the light-receiving device 54 changes attributed to the transmission spectrum of the etalon device and the received light emitted from the light-emitting device 12, the fluctuation of the output wavelength can be monitored.

Figure 3:
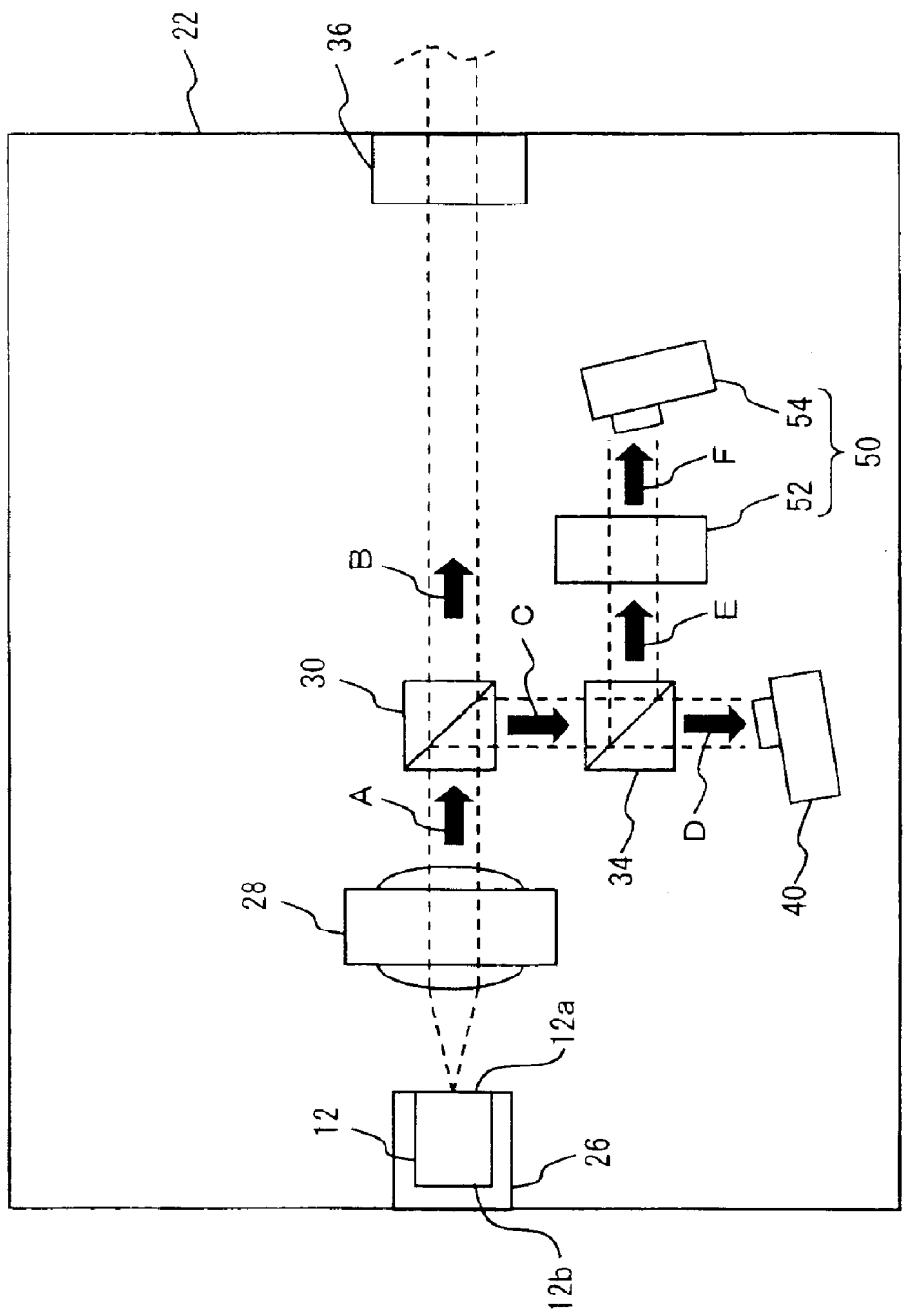
FIG. 3 shows an optical coupling between components in the optical module according to the first embodiment.
Figure 4:
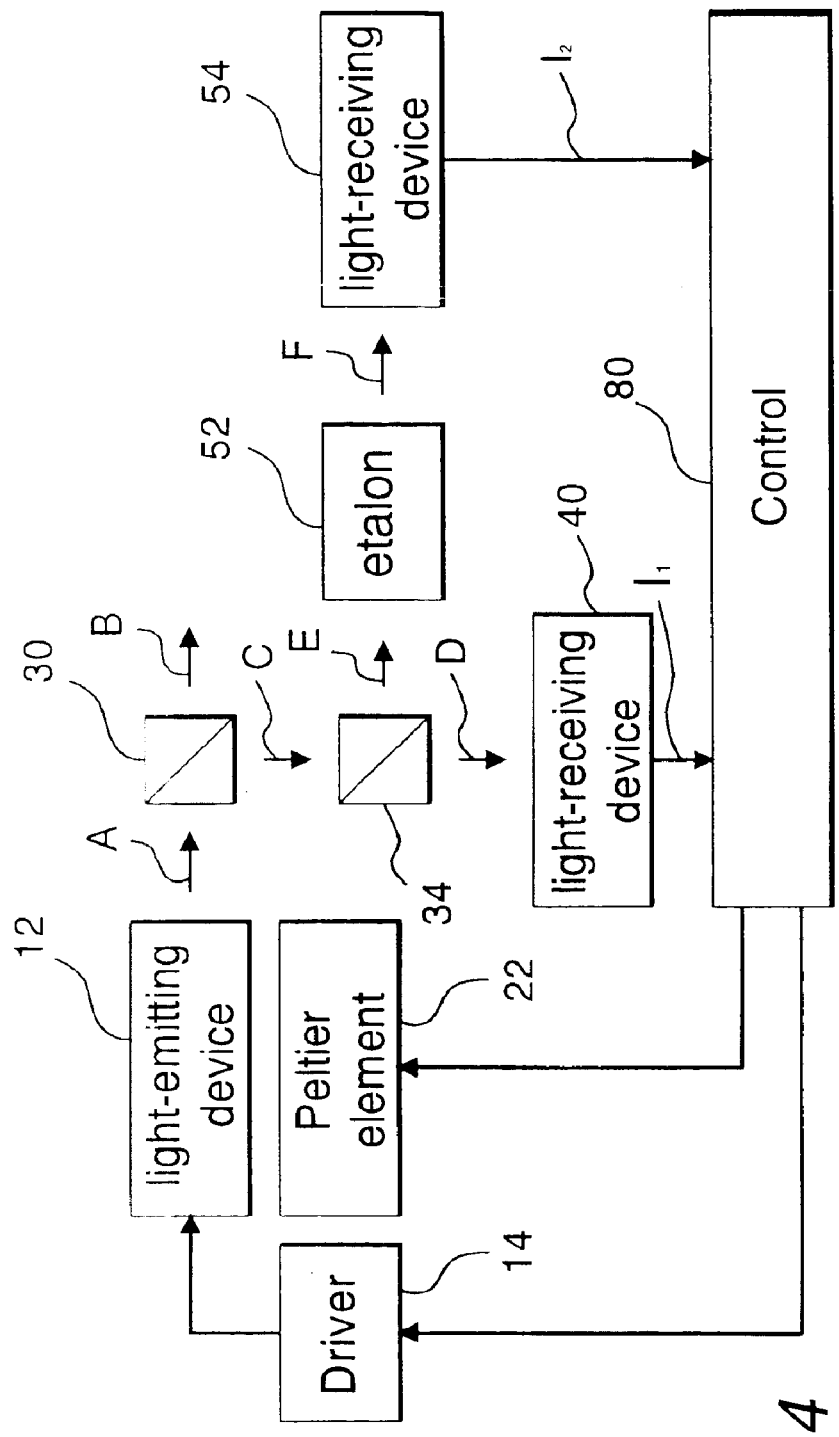
FIG. 4 is a control diagram of the optical module according to the first embodiment.

Next, the mechanism of the optical module 1 will be described as referring to FIG. 3 and FIG. 4. FIG. 3 shows an optical coupling between respective components in the module 1, and FIG. 4 shows a control diagram of the module 1. The light-emitting device 12, from the light-emitting surface 12a thereof, emits light "A" modulated by the electrical signal provided by the driver 14. The first beam splitter 30 splits light "A" into the output light "B" and the monitoring light "C". The output light "B" enters into the tip 60a of the optical fiber 60 through the optical isolator 36, the hermetic glass 62 and the condenser lens 66. The monitoring light "C" enters into the second beam splitter 34 and is split into the first monitoring light "D" and the second monitoring light "E". The first monitoring light "D" enters into the light-receiving device 40 that generates the first photocurrent $I_1$ corresponding to the magnitude of the first monitoring light "D". The second monitoring light "E" is converted to light "F" by passing through the etalon device 52 and finally enters into the second light-receiving device 54. The second light-receiving device 54 generates a photocurrent $I_2$ corresponding to the magnitude of the received light "F". The photocurrents $I_1$ and $I_2$ are lead to the control 80 provided in the outside of the package 10. The photocurrent $I_2$ varies as the output wavelength of light emitted from the light-emitting device 12 changes. The control 80 detects the shift of the output wavelength through the change of the second photocurrent $I_2$. Moreover, since the control 80 can detect the output power of the light-emitting device 12 through the first photocurrent $I_1$, the control can correct the change of the output wavelength from that of the output power. Namely, the control 80 may calculate the real change of the output wavelength by eliminating the component due to the change of the output power from the detected change of the output wavelength. The control 80, when detects the shift of the output wavelength, sends a signal to the Peltier element 22 for controlling the temperature of the light-emitting device 12 and another signal to the driver 14 for adjusting the driving current to the light-emitting device 12. The Peltier element 22 cools or heats the light-emitting device 12 depending on the control signal provided from the control 12. The driver 14 adjusts the driving current to the light-emitting device 12. By feedback control thus described, the output wavelength of the light-emitting device 12 can be converged to a predetermined wavelength.

Figure 5:
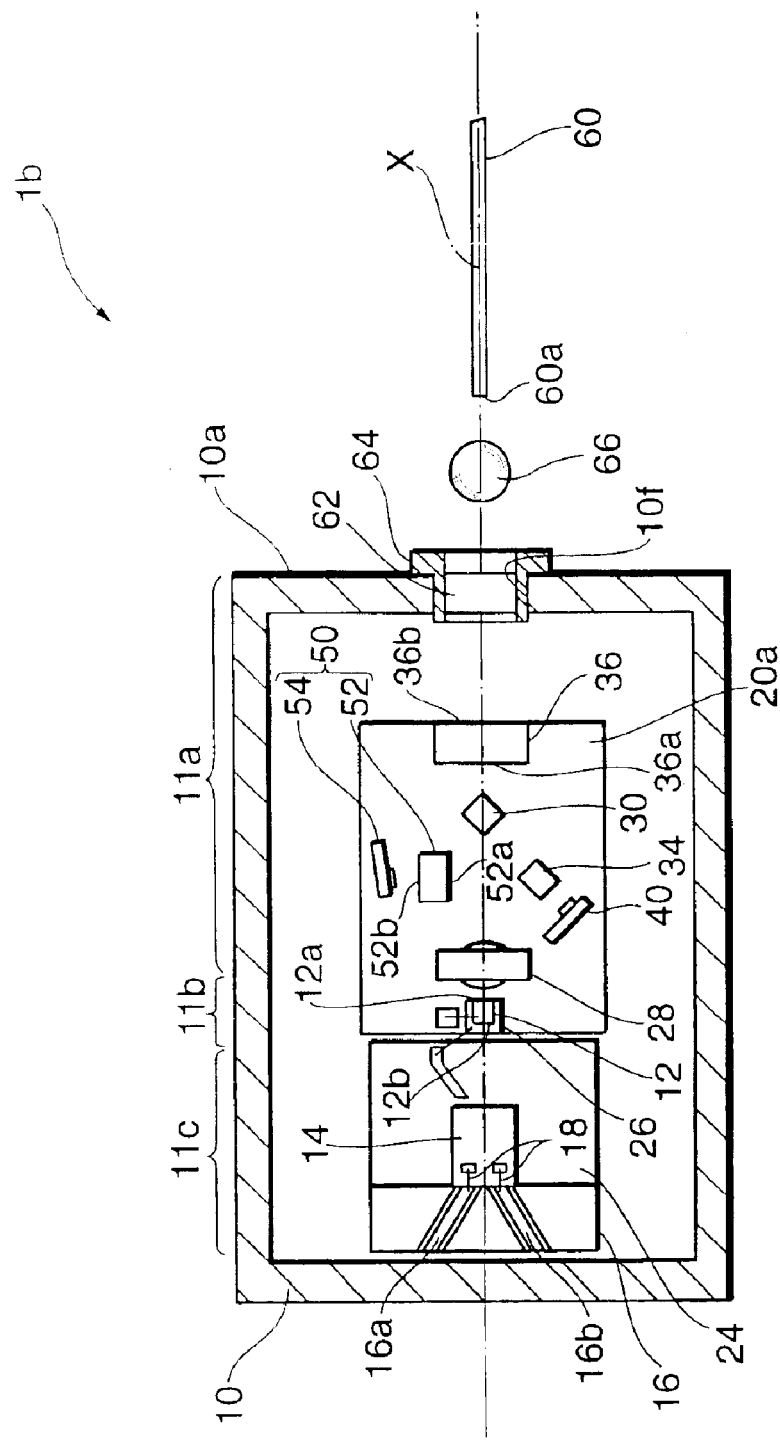
FIG. 5 shows a plan view of the optical module modified from the first embodiment.

The present invention is not restricted to the embodiment above described and may have various modifications. FIG. 5 is a plan view showing one of such modified optical module 1b. In the first embodiment in FIG. 2, the second beam splitter 34, the first light-receiving device 40, and the wavelength detector 50 are arranged in one side of the axis X on the mounting surface 20a. In the optical module 1b in FIG. 5, the mutual configuration between optical parts of the second beam splitter 34, the first light-receiving device 40 and the wavelength detector 50 is same as that of the first embodiment except that the axis X locates between the wavelength detector 50 and the second beam splitter 34. Namely, the light "E" reflected by the second beam splitter 50 travels to the direction across the axis X and reaches to the wavelength detector 50.

Second Embodiment

Figure 6:
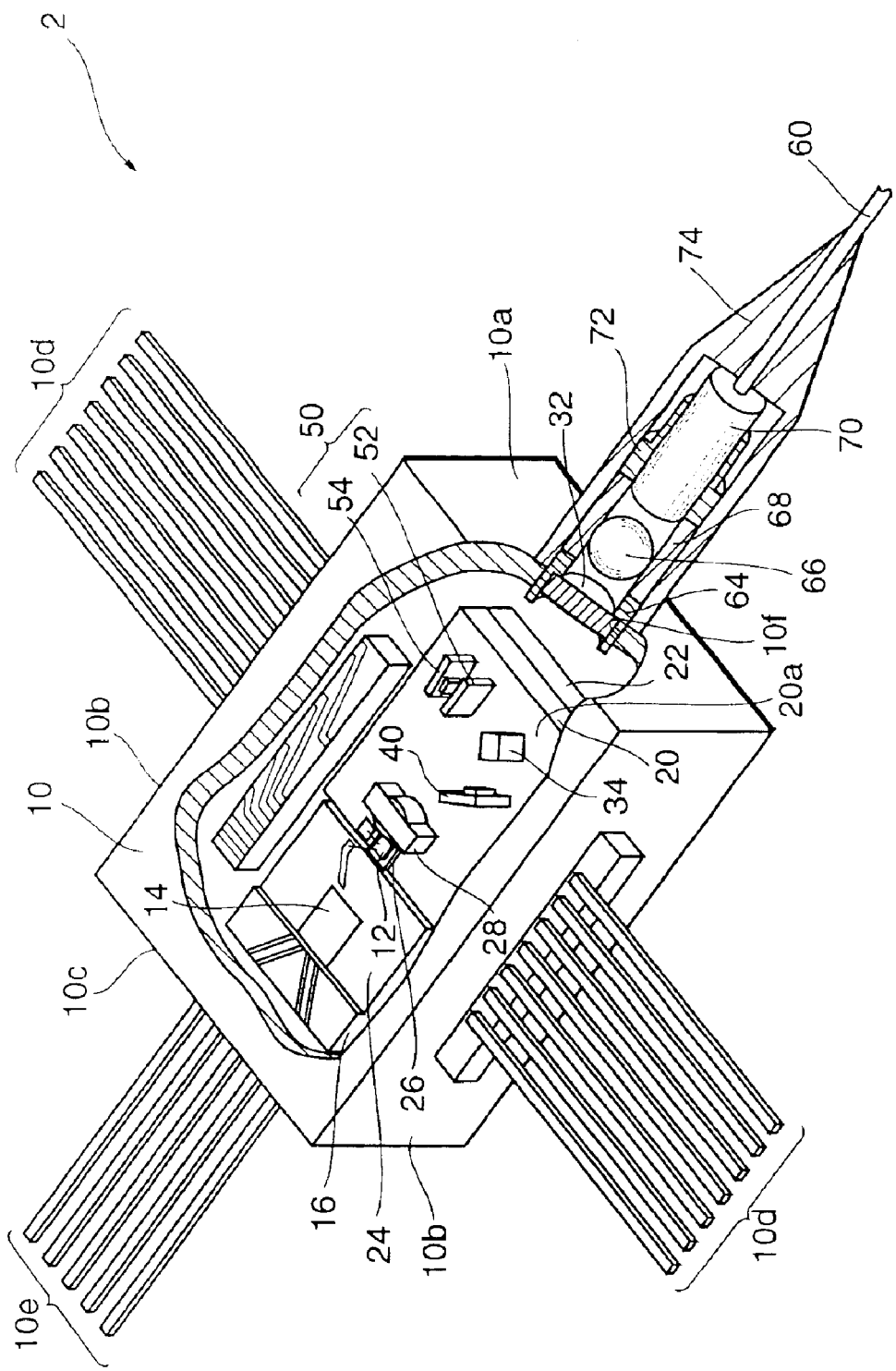
FIG. 6 is a partially perspective view according to the second embodiment.
Figure 7:
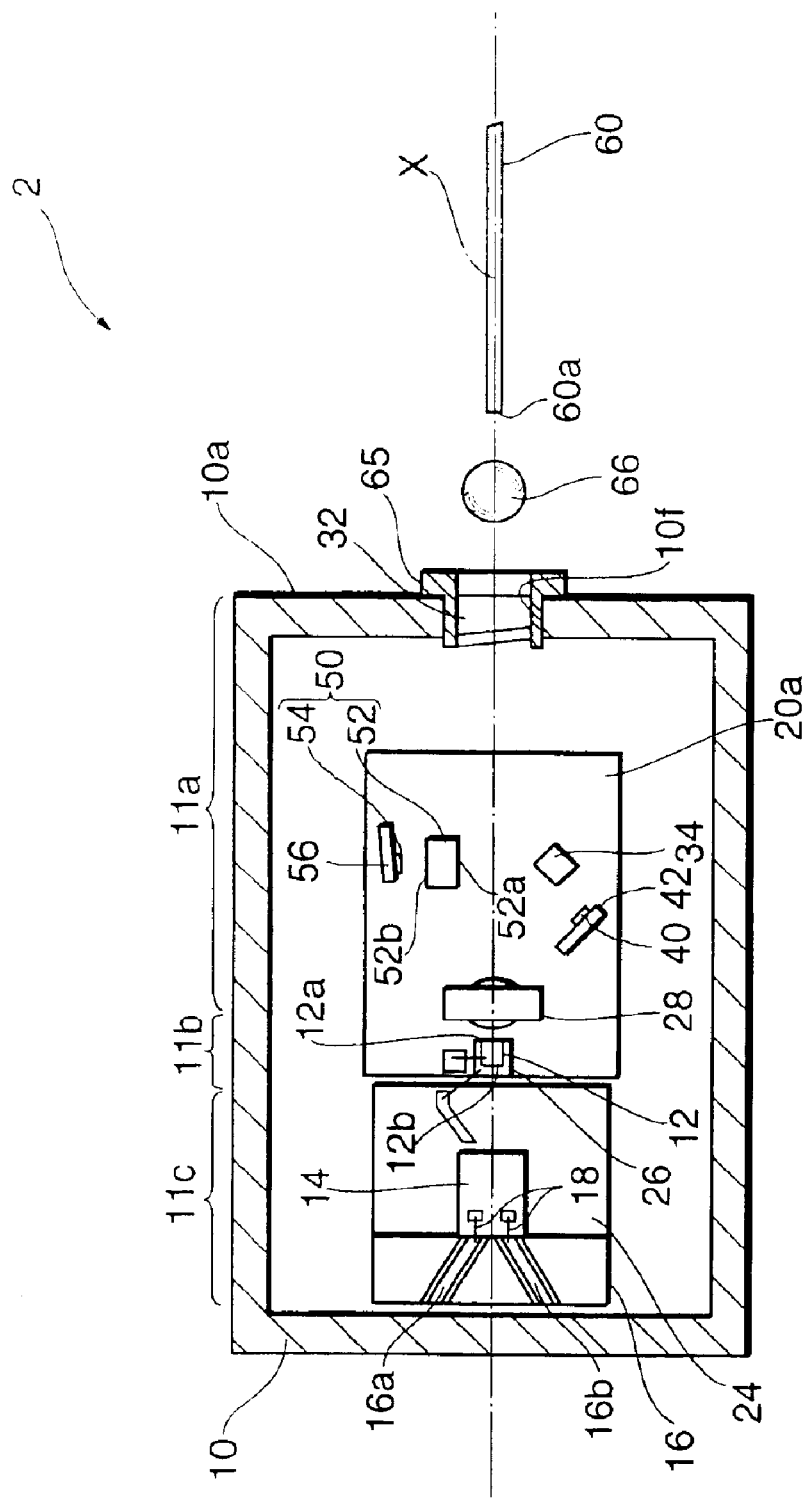
FIG. 7 shows an optical and an electrical coupling between components in the optical module according to the second embodiment.

Next, an light-emitting module 2 according to the second embodiment will be described. FIG. 6 is a perspective view of the module 2, and FIG. 7 is a plan view showing optical and electrical couplings between components in the module 2. The module 2 comprises, similar to the first module 1 shown in FIG. 1, a package 10, a light-emitting device 12, a driver 14, a collimating-lens 28, a first beam splitter 32, a second beam splitter 34, a first light-receiving device 40, a wavelength detector 50 and an optical fiber 60. In the second embodiment in FIG. 6, the first beam splitter 32 is provided within the opening 10f provided in the front portion 10a of the package 10. The optical coupling between the first beam splitter 32 and the second beam splitter 34, that between the second beam splitter 34 and the light-receiving device 40 and that between the second beam splitter 34 and the wavelength detector 50 are same as those of the first embodiment.

In the module 2, the first beam splitter 32 serves a function to seal the package 10 air-tightly, which reduces the number of components thereby miniaturizing the module. The first beam splitter 32 may be made of sapphire with a light-incident surface and a light-emitting surface. In the embodiment, the light-incident surface of the first beam splitter 32 splits the light from the light-receiving device 12 into the output light and the monitoring light for detecting the change of the output power and the output wavelength. The light-incident surface of the first beam splitter 32 may have a high-reflective coating.

Third Embodiment

Figure 8:
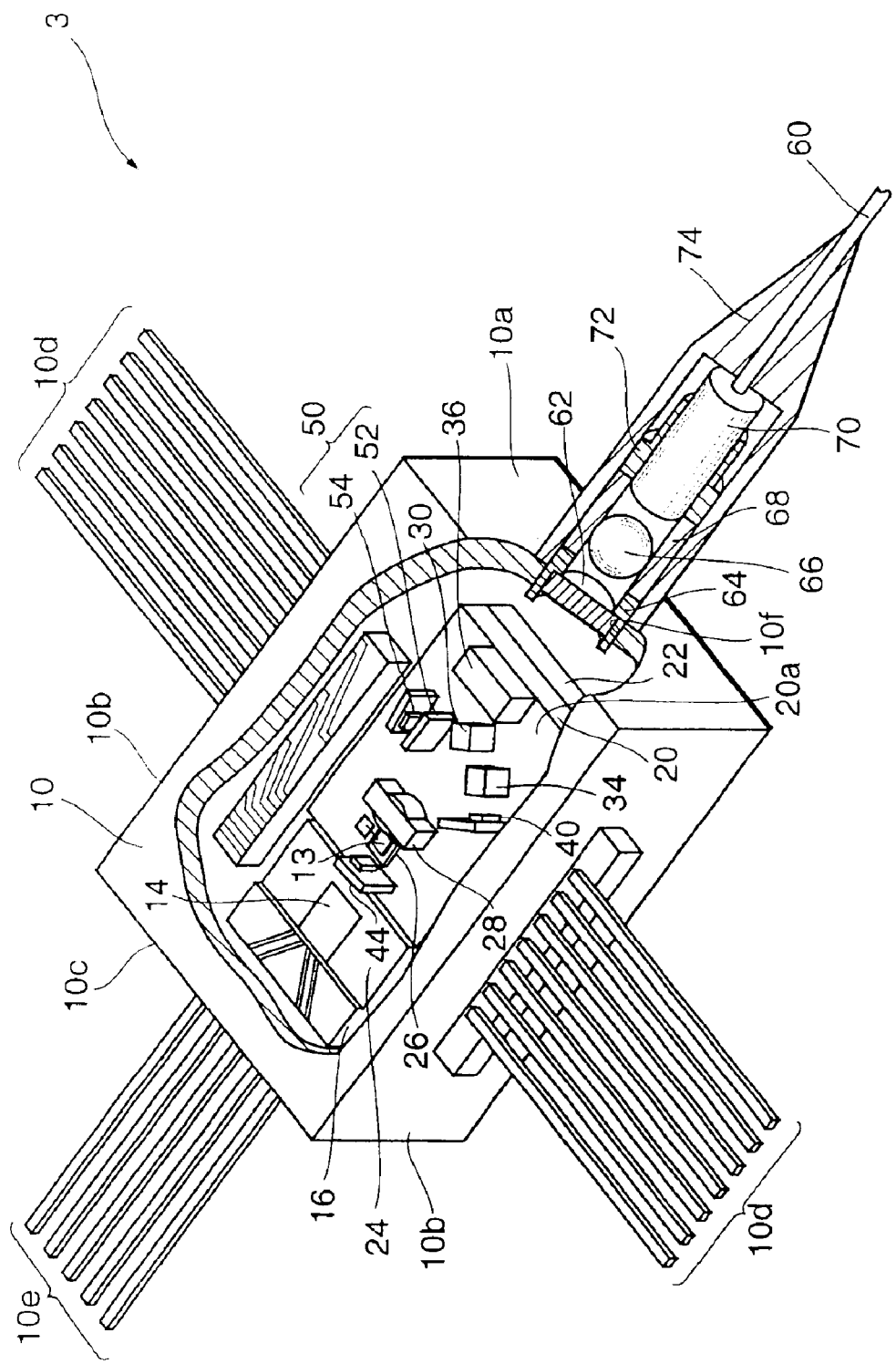
FIG. 8 is a partially perspective view of the optical module according to the third embodiment.
Figure 9:
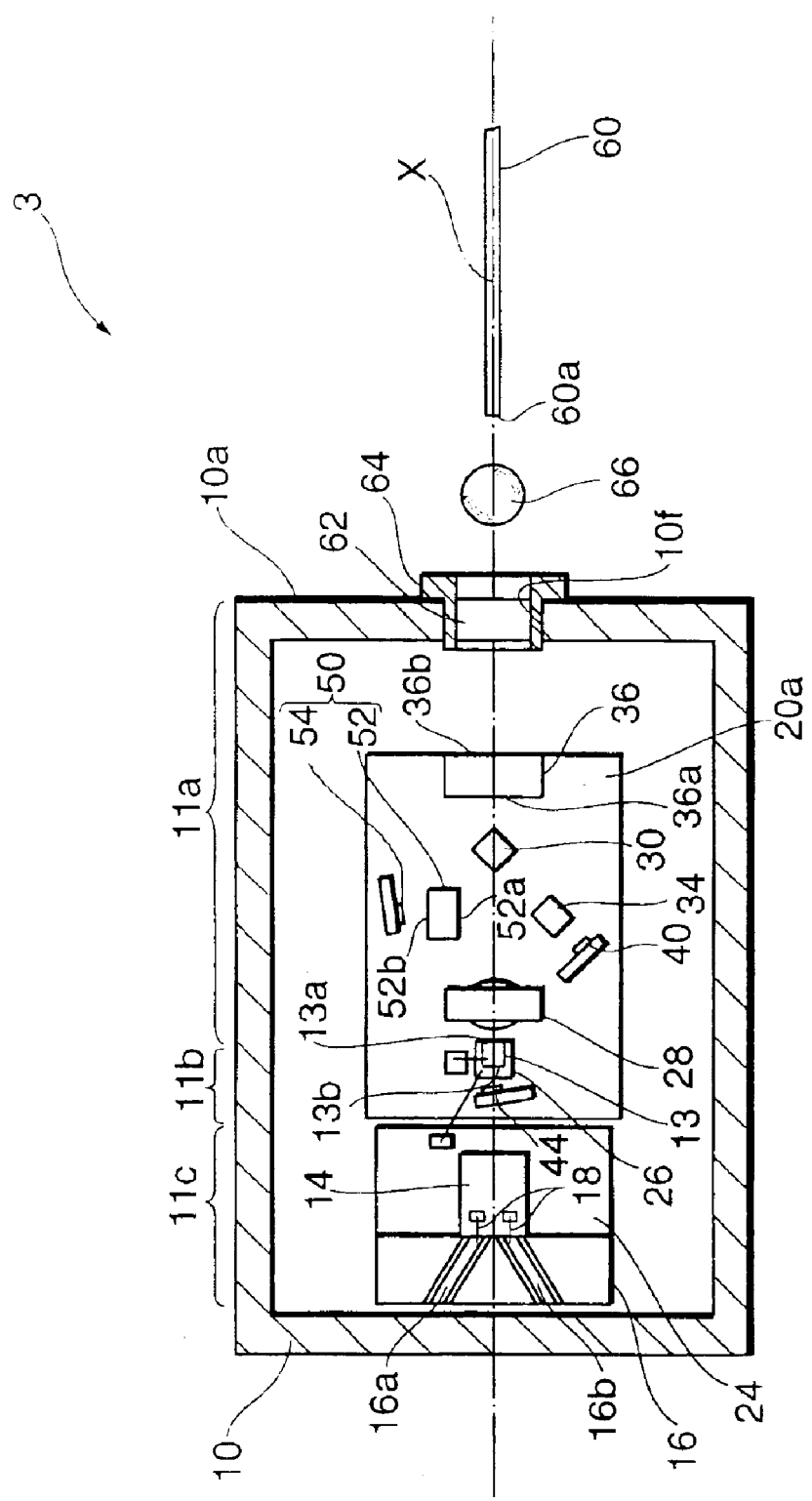
FIG. 9 shows an optical and an electrical coupling between components in the optical module according to the third embodiment.

Next, a light-emitting module 3 according to the third embodiment will be described. FIG. 8 is a perspective view and FIG. 9 is an optical arrangement of the module 3. Similar to the first and second embodiments, the module 3 comprises a package 10, a light-emitting device 13, a driver 14, a collimating-lens 28, a first beam splitter 30, a second beam splitter 34, a first light-receiving device 40, a wavelength detector 50, an optical fiber 60 and a third light-receiving device 44. In the present embodiment, the light-emitting device 13 is an EA-DFB device. Further, the third light-receiving device 44 is provided for receiving light from the rear surface of the light-emitting device 13. The optical configuration between respective components except the third light-receiving device 44 and the light-emitting device 13 are same as those of the module 1 shown in FIG. 4 and FIG. 5.

The light-emitting device 13 is the EA-DFB device in which the laser diode of the distributed feedback type (DFB-LD) and the semiconductor modulator of the electro-absorption type (EA) are integrated. In the EA-DFB device, the DFB-LD is operated in the direct current mode, and the EA device modulates the light emitted from the DFB-LD.

The third light-receiving device 44 may be a photodiode and is mounted on the mounting surface 20a through an sub-mount 46, which optically couples to the light-reflecting surface 13b of the light-emitting device 13. The third light-receiving device 44 receives light from the light-emitting device 13 and generates a third photocurrent corresponding to the magnitude of the light.

Figure 10:
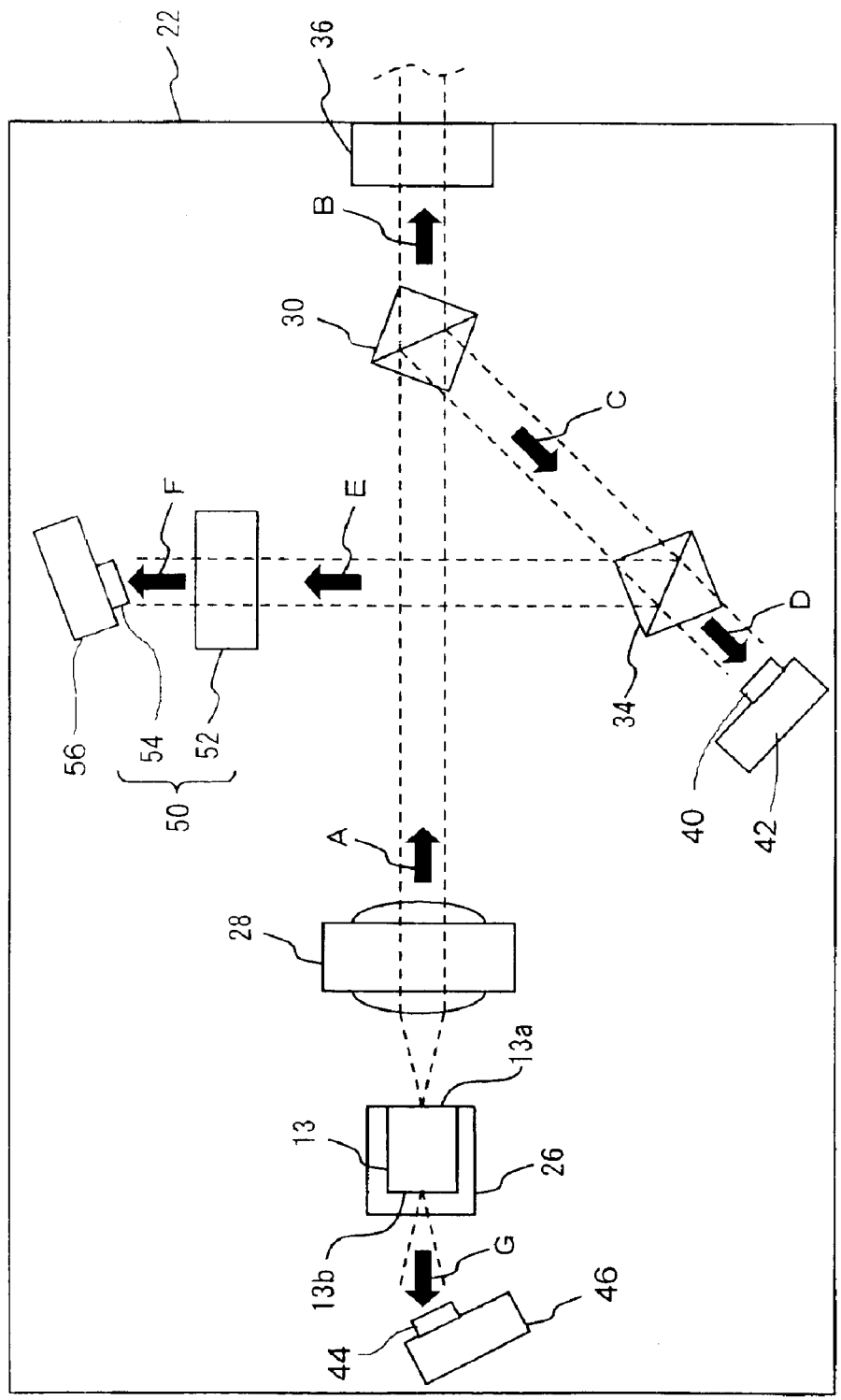
FIG. 10 shows an optical coupling between components in the optical module according to the third embodiment.
Figure 11:
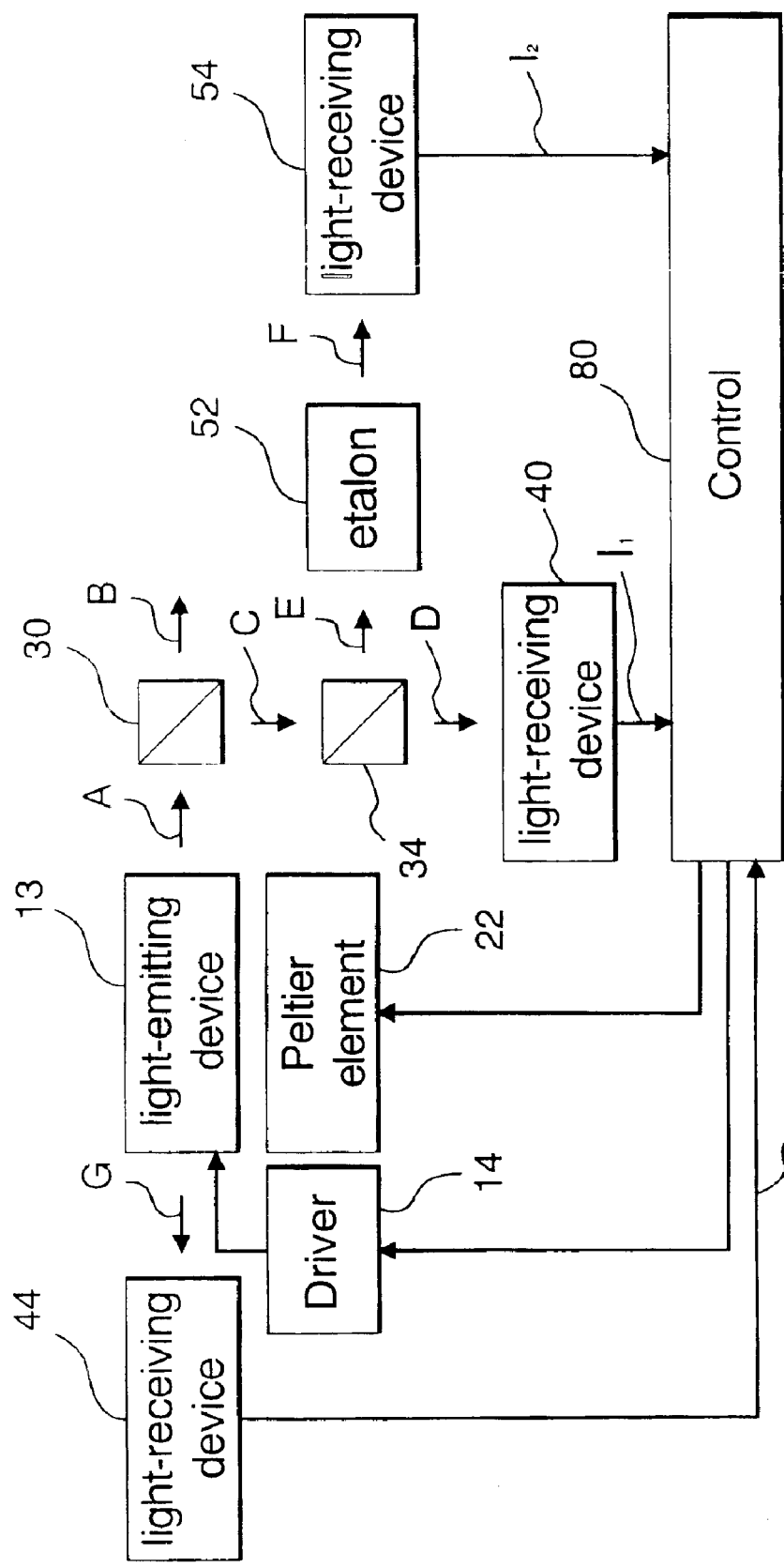
FIG. 11 is a control diagram of the optical module according to the third embodiment.

The operation of the module 3 will be explained hereinbelow as referring to FIG. 10 and FIG. 11. FIG. 10 is an optical arrangement of components in the module 3 and FIG. 11 is a control diagram of the module 3. The light-emitting device 13, responding to the driving signal provided from the driver 14, emits light "A" form the light-emitting surface 13a and also light "G" from the light-reflecting surface 13b. The light "G" is received by the third light-receiving device 44 that outputs the third photocurrent $I_3$ to the control 80. The light "A" reaches to the tip of the optical fiber 60 and two light-receiving devices 40 and 54 passing through the same optical path as the module 1 of the first embodiment. The first light-receiving device 40 generates the photocurrent $I_1$ that reflects the output power and the second light-receiving device 54 generates another photocurrent $I_2$ that depends on the shift of the output wavelength of the light front the light-emitting device 12. Algorithm and mechanism to control the output wavelength and the output power of the light-emitting device 13 is same as those previously described in the first and the second embodiments. In addition to the algorithm of the previous embodiment, the module 3 may detect an optical absorption in the EA device by comparing the photocurrent $I_1$ to the photocurrent $I_3$, which enables to maintenance the EA-DFB device because the absorption therein will increases when deterioration of the EA device proceeds.

Forth Embodiment

Next, an assembling process of the optical module 1 will be described. First, the light-emitting device 12 is mounted on a heat sink 26, and the heat sink 26 with the light-emitting device 12 is die-bonded in the second region 11b on the mounting surface 20a of the first bench 20 by using a method of an image recognition technique. Second, the collimating-lens 28 is fixed on the mounting surface 20a by an UV curable adhesive. The alignment of the collimating-lens is preformed by the inspection, with the Infrared Camera, of the image formed by the light generated by the light-emitting device 12 and transmitted through the collimating lens 28. Next, the first beam splitter 30, the second beam splitter 34, two light-receiving devices 40 and 54, and the optical isolator 36 are fixed on the mounting surface by the UV curable adhesive. Two light-receiving devices are mounted through respective sub-mounts 42 and 56. Next, the etalon is mounted and fixed on the mounting surface 20a. The optical alignment of the etalon is so performed that the light-receiving device 54 generates the optimum photocurrent $I_2$ when the light-emitting device 12 is practically driven and the light-receiving device 54 receives the light therefrom. The sub-assembly, in which the components of the light-emitting device 12, light-receiving devices 40 and 54, the etalon 52, and two beam splitters 30 and 34 are mounted on the first base 20, is installed in the package 10 in which the Peltier element is previously assembled. Electrical connection between the light-emitting device 12, light-receiving devices 40 and 54, the driver 14 and lead terminals 10d is performed with bonding-wires. The ring member 64 with the hermetic glass therein is disposed on the opening 10f and fixed by the laser welding. Optical alignment between the condenser lens 66, the optical fiber 60 and the light-emitting device 12 is performed so as to attain the optimum output power from the optical fiber by adjusting the position of the lens holder 68 and the ferrule holder 72. Finally, the boot 74 covers the ring member 64, the lens holder 68 and the ferrule holder 72, thus completing the optical module 1.

In the optical module according to the present invention, thus described in various exemplary embodiments, the first beam splitter is arranged in the front side of the light-emitting module and splits light from the light-emitting surface of the light-emitting device and generates the output light and the monitoring light. The second beam splitter 34 splits the monitoring light and generates the first monitoring light, which controls the output power, and the second monitoring light, which controls the output wavelength, of the light emitted from the light-emitting device. Since the wavelength detector 50 detects the light from the light-emitting surface of the light-emitting device, the driver 14 that drives the light-emitting device can be arranged adjacent to the light-emitting device, which shortens the electrical connection therebetween and enables high-speed operation of the optical module.

Moreover in the present invention, the light-receiving device 40 can detect the output power of the light-emitting device. The second monitoring current output from the light-receiving device 54 in the wavelength detector 50 reflects the change of not only the output wavelength but also the output power of the light from the light-emitting device. In the present invention, since the output power and the output wavelength can be detected independently, the change of the output wavelength is precisely controlled by reducing the contribution of the change of the output power from that of the output wavelength, which enables the optical module to apply the wavelength divisional multiplication (WDM) system.

When the EA-DFB device is used as the light-emitting device, since the modulated light emitted from the front side of the EA-DFB device can be detected by the light-receiving device 50 arranged in the front side, the light-emitting device can be precisely controlled compared with the case when the light emitted from the rear side is monitored, even when the output power of the light is affected by the absorption due to the EA device.

What is claimed is:

1. A light-emitting module comprising:
    a light-emitting device having a light-emitting surface and a light-reflecting surface, the light-emitting device emitting light having an output wavelength and an output power from the light-emitting surface;
    a first light-receiving device for detecting the output power of the light emitted from the light-emitting surface of the light-emitting device and for outputting a first output corresponding to the output power; and
    a wavelength detector comprising an etalon device and a second light-receiving device for outputting a second output corresponding to the output wavelength of the light emitted from the light-emitting surface.

2. The light-emitting module according to claim 1, further comprises a driver for electrically driving the light-emitting device and a package for enclosing the light-emitting device and the driver, the light-emitting device and the driver being disposed side by side configuration in the package.

3. The light-emitting module according to claim 2, further comprises
    a first beam splitter for splitting the light emitted from the light-emitting device into an output light and a monitoring light,
    a second beam splitter for splitting the monitoring light split by the first beam splitter into a first monitoring light for transmitting to the first light-receiving device and a second monitoring light for transmitting to the etalon device, the etalon device transmitting the second monitoring light to the second light-receiving device.

4. The light-emitting module according to claim 3, further comprises
    a Peltier element thermally coupling to the light-emitting device for adjusting a temperature thereof, the Peltier element being controlled based on the second output provided from the second light-receiving device.

5. The light-emitting module according to claim 3, wherein the package includes a first, a second and a third regions each arranged in this order, and an opening for transmitting the output light, and
    wherein the third region disposes the driver therein, the second region disposes the light-emitting device therein and the first region disposes the first and the second light-receiving devices, the etalon devices and the second beam splitter therein.

6. The light-emitting module according to claim 5, wherein the first beam splitter is disposed in the first region.

7. The light-emitting module according to claim 5, wherein the first beam splitter is disposed in the opening provided in the package.

8. The light-emitting module according to claim 3, wherein the first and the second beam splitters are respectively one of a half mirror and a cubed beam splitter.

9. The light-emitting module according to claim 1, wherein the first and the second light-receiving devices are semiconductor photodiodes.

10. The light-emitting module according to claim 1, wherein the light-emitting device is a semiconductor laser diode.

11. The light-emitting module according to claim 1, wherein the light-emitting device is a type of a semiconductor laser diode integrated with an optical modulator.

12. The light-emitting module according to claim 11, wherein the light-emitting device is a type of a distributed feedback laser diode integrated with a semiconductor electro-absorption device.

13. The light-emitting module according to claim 11, further comprises a third light-receiving device for detecting light emitted from the light-reflecting surface of the light-emitting device and for generating a third output corresponding to the light emitted from the light-reflecting surface, wherein a characteristic of the optical modulator is detected by a comparison between the first output provided from the first light-receiving device and the third output provided from the third light-receiving device.

* * * * *